(12) United States Patent
Morimura et al.

(10) Patent No.: US 11,498,482 B2
(45) Date of Patent: Nov. 15, 2022

(54) NOTIFICATION DEVICE

(71) Applicant: Toyota Jidosha Kabushiki Kaisha, Toyota (JP)

(72) Inventors: Junichi Morimura, Shizuoka-ken (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/038,390

(22) Filed: Sep. 30, 2020

(65) Prior Publication Data

US 2021/0039552 A1 Feb. 11, 2021

Related U.S. Application Data

(63) Continuation of application No. 16/715,626, filed on Dec. 16, 2019, now Pat. No. 10,821,891.

(30) Foreign Application Priority Data

Dec. 27, 2018 (JP) .............................. JP2018-245875

(51) Int. Cl.
*B60Q 5/00* (2006.01)
*B60Q 1/18* (2006.01)
(Continued)

(52) U.S. Cl.
CPC .............. *B60Q 5/006* (2013.01); *B60Q 1/18* (2013.01); *B60Q 1/525* (2013.01); *B60W 40/10* (2013.01)

(58) Field of Classification Search
CPC .......... B60Q 5/006; B60Q 1/18; B60Q 1/525; B60Q 1/444; B60Q 1/035; B60Q 5/005; B60Q 1/50; B60W 40/10
See application file for complete search history.

(56) References Cited

U.S. PATENT DOCUMENTS 5,140,304 A * 8/1992 Miller .................. B60Q 1/2611
116/147
5,635,903 A 6/1997 Koike et al.
(Continued)

FOREIGN PATENT DOCUMENTS

EP 3357754 A1 8/2018
JP S61108023 A 5/1986
(Continued)

OTHER PUBLICATIONS

U.S. Appl. No. 16/715,626, filed Dec. 16, 2019, Junichi Morimura.
(Continued)

*Primary Examiner* — Ojiako K Nwugo
(74) *Attorney, Agent, or Firm* — Dinsmore & Shohl LLP

(57) ABSTRACT

A notification device includes: a notification-sound output portion provided in a vehicle and configured to output a notification sound toward the outside of the vehicle; a notification display portion provided in the vehicle and configured to output a notification display toward the outside of the vehicle; a notification controlling portion configured to control the notification sound of the notification-sound output portion and the notification display of the notification display portion; and a stop-state determination portion configured to determine whether the vehicle during the automatic driving enters a stop state or not. When the stop-state determination portion determines that the vehicle during the automatic driving enters the stop state, the notification controlling portion outputs a stop-time notification sound as the notification sound by the notification-sound output portion and outputs a stop-time notification display as the notification display by the notification display portion.

5 Claims, 8 Drawing Sheets

(51) Int. Cl.
*B60W 40/10* (2012.01)
*B60Q 1/50* (2006.01)

(56) References Cited

U.S. PATENT DOCUMENTS

| | | | |
|---|---|---|---|
| 5,689,232 A * | 11/1997 | O'Shaughnessy | B62J 6/056 340/468 |
| 9,196,164 B1 | 11/2015 | Urmson et al. | |
| 9,283,887 B1 * | 3/2016 | Carpenter | B60Q 1/46 |
| 9,499,095 B1 * | 11/2016 | Buehler | B60Q 1/2611 |
| 9,953,538 B1 | 4/2018 | Matthiesen et al. | |
| 10,000,152 B1 * | 6/2018 | Scalea | B60Q 9/008 |
| 10,235,122 B1 | 3/2019 | Goel et al. | |
| 10,434,935 B1 * | 10/2019 | Zhang | G08G 1/096775 |
| 10,657,819 B2 | 5/2020 | Wan et al. | |
| 2005/0237175 A1 | 10/2005 | Paulson et al. | |
| 2011/0175713 A1 | 7/2011 | Nakayama | |
| 2013/0311043 A1 * | 11/2013 | Kobana | B60T 7/12 701/41 |
| 2015/0229727 A1 * | 8/2015 | Schafer | H04W 4/48 709/219 |
| 2015/0258928 A1 * | 9/2015 | Goto | B60Q 1/24 701/49 |
| 2017/0088035 A1 * | 3/2017 | Williams | B60Q 1/50 |
| 2017/0088040 A1 * | 3/2017 | Williams | B60Q 1/50 |
| 2017/0225567 A1 | 8/2017 | Tsuda | |
| 2018/0126986 A1 * | 5/2018 | Kim | B60W 50/087 |
| 2018/0173237 A1 | 6/2018 | Reiley et al. | |
| 2018/0178766 A1 * | 6/2018 | Oba | B60W 50/14 |
| 2018/0224860 A1 | 8/2018 | Warshauer-Baker et al. | |
| 2018/0276986 A1 | 9/2018 | Delp | |
| 2018/0297612 A1 | 10/2018 | Fukamachi | |
| 2018/0370503 A1 | 12/2018 | Graney | |
| 2019/0015976 A1 | 1/2019 | Sweeney et al. | |
| 2019/0019411 A1 | 1/2019 | Sweeney et al. | |
| 2019/0197325 A1 | 6/2019 | Reiley et al. | |
| 2019/0197886 A1 | 6/2019 | Kanehara et al. | |
| 2019/0221058 A1 | 7/2019 | Nix et al. | |
| 2019/0344801 A1 * | 11/2019 | Ishii | G05D 1/0061 |
| 2019/0377350 A1 | 12/2019 | Hunt et al. | |
| 2020/0031362 A1 * | 1/2020 | Lee | B60W 60/0059 |
| 2020/0114813 A1 | 4/2020 | Lujan et al. | |
| 2020/0166924 A1 | 5/2020 | Pedersen et al. | |
| 2020/0207266 A1 | 7/2020 | Morimura et al. | |
| 2020/0398747 A1 | 12/2020 | Tani | |

FOREIGN PATENT DOCUMENTS

| | | |
|---|---|---|
| JP | H07182587 A | 7/1995 |
| JP | 2001-058542 A | 3/2001 |
| JP | 3162338 U | 8/2010 |
| JP | 2012-126207 A | 7/2012 |
| WO | 2012/095985 A1 | 7/2012 |
| WO | 2017/056995 A1 | 4/2017 |

OTHER PUBLICATIONS

Office Action Issued to U.S. Appl. No. 17/038,673 dated Jul. 21, 2021.
Non-Final Office Action issued to U.S. Appl. No. 17/038,673 dated Dec. 27, 2021.
Office Action dated Jun. 6, 2022 to U.S. Appl. No. 17/038,673, filed Sep. 30, 2020.
Office Action dated Sep. 2, 2022 to U.S. Appl. No. 17/536,729, filed Nov. 29, 2021.
Notice of Allowance dated Sep. 19, 2022 to U.S. Appl. No. 17/038,673, filed Sep. 30, 2020.

* cited by examiner

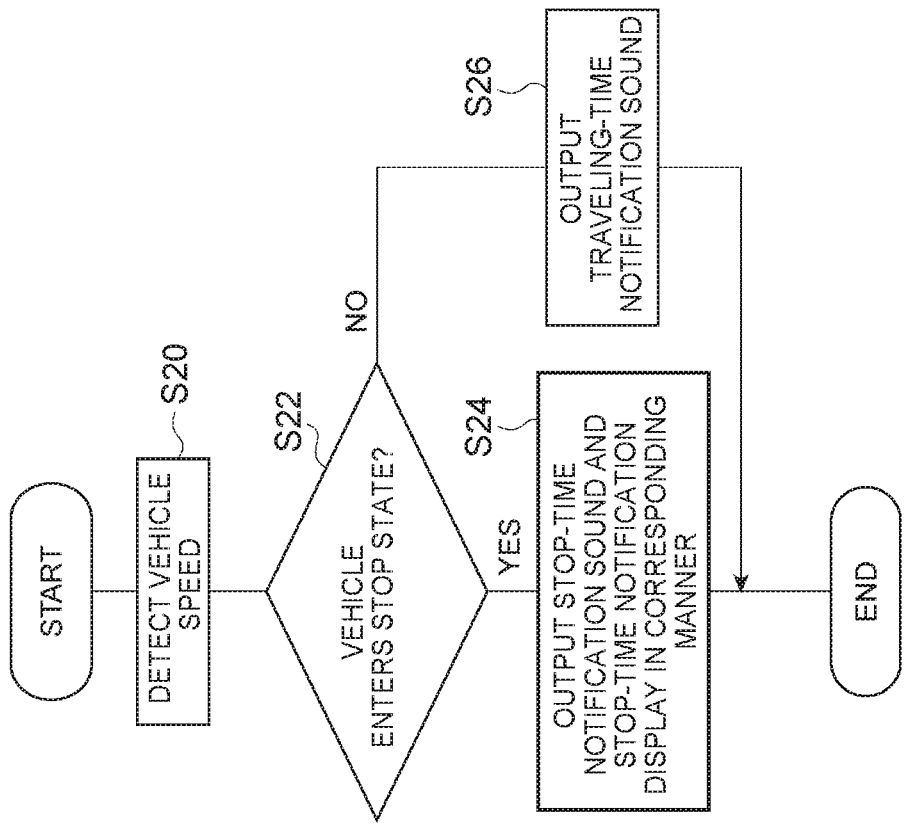
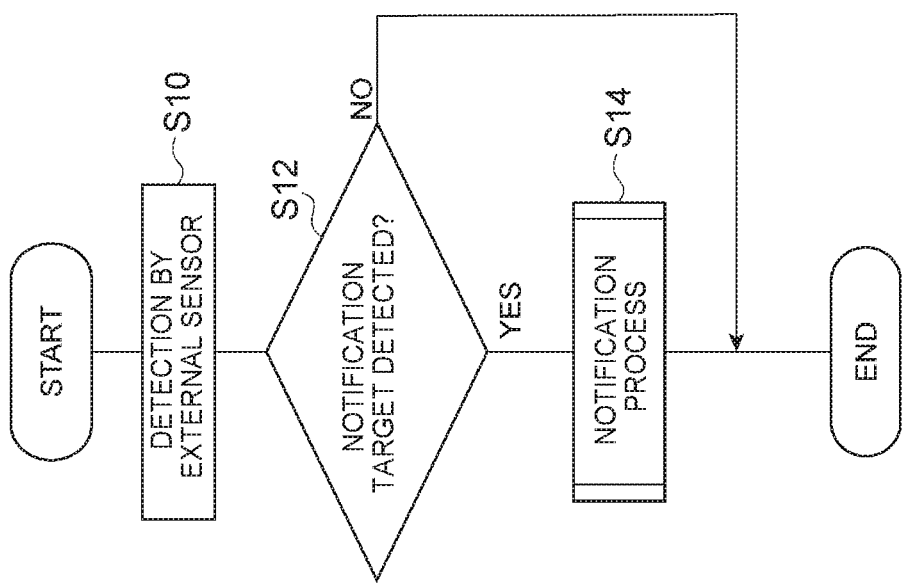

NOTIFICATION DEVICE

CROSS-REFERENCE TO RELATED APPLICATIONS

This application claims priority to U.S. patent application Ser. No. 16/715,626 filed on Dec. 16, 2019, which claims priority to Japanese Patent Application No. 2018-245875 filed on Dec. 27, 2018, both of which are incorporated herein by reference in their entirety including the specification, drawings, and abstract.

BACKGROUND

1. Technical Field

The disclosure relates to a notification device.

2. Description of Related Art

Japanese Unexamined Patent Application Publication No. 2012-126207 (JP 2012-126207 A) is known as a technical literature about a notification device in the related art. JP 2012-126207 A describes that, when a notification device configured to notify the presence of a vehicle detects that the vehicle enters a stop state, the notification device outputs a predetermined notification sound.

SUMMARY

However, a pedestrian or the like may not grasp the state of the vehicle accurately only by the output of the notification sound like the notification device in the related art. In a case where a plurality of vehicles is present, a pedestrian may not be able to determine, only based on the notification sound thus output, which vehicle outputs the notification sound. Thus, there is room for improvement.

In view of this, in this technical field, it is desired to provide a notification device that can notify a stop state of a vehicle to a pedestrian or the like around the vehicle by display in addition to sound.

One aspect of the disclosure is to provide a notification device provided in a vehicle that travels by automatic driving and configured to perform notification to surroundings around the vehicle. The notification device includes a notification-sound output portion, a notification display portion, a notification controlling portion, and a stop-state determination portion. The notification-sound output portion is provided in the vehicle and configured to output a notification sound toward the outside of the vehicle. The notification display portion is provided in the vehicle and configured to output a notification display toward the outside of the vehicle. The notification controlling portion is configured to control the notification sound of the notification-sound output portion and the notification display of the notification display portion. The stop-state determination portion is configured to determine whether the vehicle during the automatic driving enters a stop state or not. When the stop-state determination portion determines that the vehicle during the automatic driving enters the stop state, the notification controlling portion outputs a stop-time notification sound as the notification sound by the notification-sound output portion and outputs a stop-time notification display as the notification display by the notification display portion.

In the notification device according to one aspect of the disclosure, when it is determined that the vehicle during the automatic driving enters the stop state, the stop-time notification sound is output as the notification sound by the notification-sound output portion, and the stop-time notification display is output as the notification display by the notification display portion. This makes it possible to appropriately notify the stop state of the vehicle to a pedestrian or the like around the vehicle by the display in addition to the sound.

In the notification device according to one aspect of the disclosure, the stop-time notification sound may be an intermittent sound. In the notification device, the stop-time notification sound is an intermittent sound, and therefore, it is possible to give an impression that the vehicle stops to the pedestrian or the like around the vehicle, thereby making it possible for the pedestrian or the like to easily recognize the stop state of the vehicle.

In the notification device according to one aspect of the disclosure, the stop-time notification sound may change in volume or frequency as time elapses. The stop-time notification display may change in luminance or chromaticity as time elapses. The notification controlling portion may cause the change of the stop-time notification sound to correspond to the change of the stop-time notification display. In the notification device, the change of the stop-time notification sound the volume or frequency of which changes as time elapses is caused to correspond to the change of the stop-time notification display the luminance or chromaticity of which changes as time elapses. This accordingly makes it possible for the pedestrian or the like around the vehicle to more easily recognize the stop state of the vehicle. Further, in a case where a plurality of vehicles is present, the pedestrian or the like can recognize which vehicle outputs the stop-time notification sound, from the correspondence with the stop-time notification display.

In the notification device according to one aspect of the disclosure, the stop-time notification sound may be an intermittent sound. The stop-time notification display may be a flashing display. The notification controlling portion may cause a sound-production timing of the stop-time notification sound as the intermittent sound to correspond to a lighting timing of the stop-time notification display as the flashing display. In the notification device, the sound-production timing of the stop-time notification sound as an intermittent sound is caused to correspond to the lighting timing of the stop-time notification display as a flashing display. This accordingly makes it possible for the pedestrian or the like around the vehicle to more easily recognize the stop state of the vehicle. Further, in a case where a plurality of vehicles is present, the pedestrian or the like can recognize which vehicle outputs the stop-time notification sound, from the correspondence with the stop-time notification display.

The notification device according to one aspect of the disclosure may further include a deceleration-state determination portion configured to determine whether the vehicle during the automatic driving is in a deceleration state or not. When the deceleration-state determination portion determines that the vehicle during the automatic driving is in the deceleration state, the notification controlling portion may output a deceleration-time notification sound as the notification sound by the notification-sound output portion. In the notification device, when it is determined that the vehicle during the automatic driving is in the deceleration state, the deceleration-time notification sound is output as the notification sound by the notification-sound output portion. This makes it possible to appropriately notify the deceleration state of the vehicle to the pedestrian or the like around the vehicle.

With the notification device according to one aspect of the disclosure, it is possible to appropriately notify the stop state of the vehicle to the pedestrian or the like around the vehicle by the display in addition to the sound.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a flowchart illustrating one example of a notification sound output process;

FIG. 5B is a flowchart illustrating one example of a stop-time notification process;

DETAILED DESCRIPTION OF EMBODIMENTS

An embodiment of the disclosure will be described below with reference to the drawings.

Figure 1:
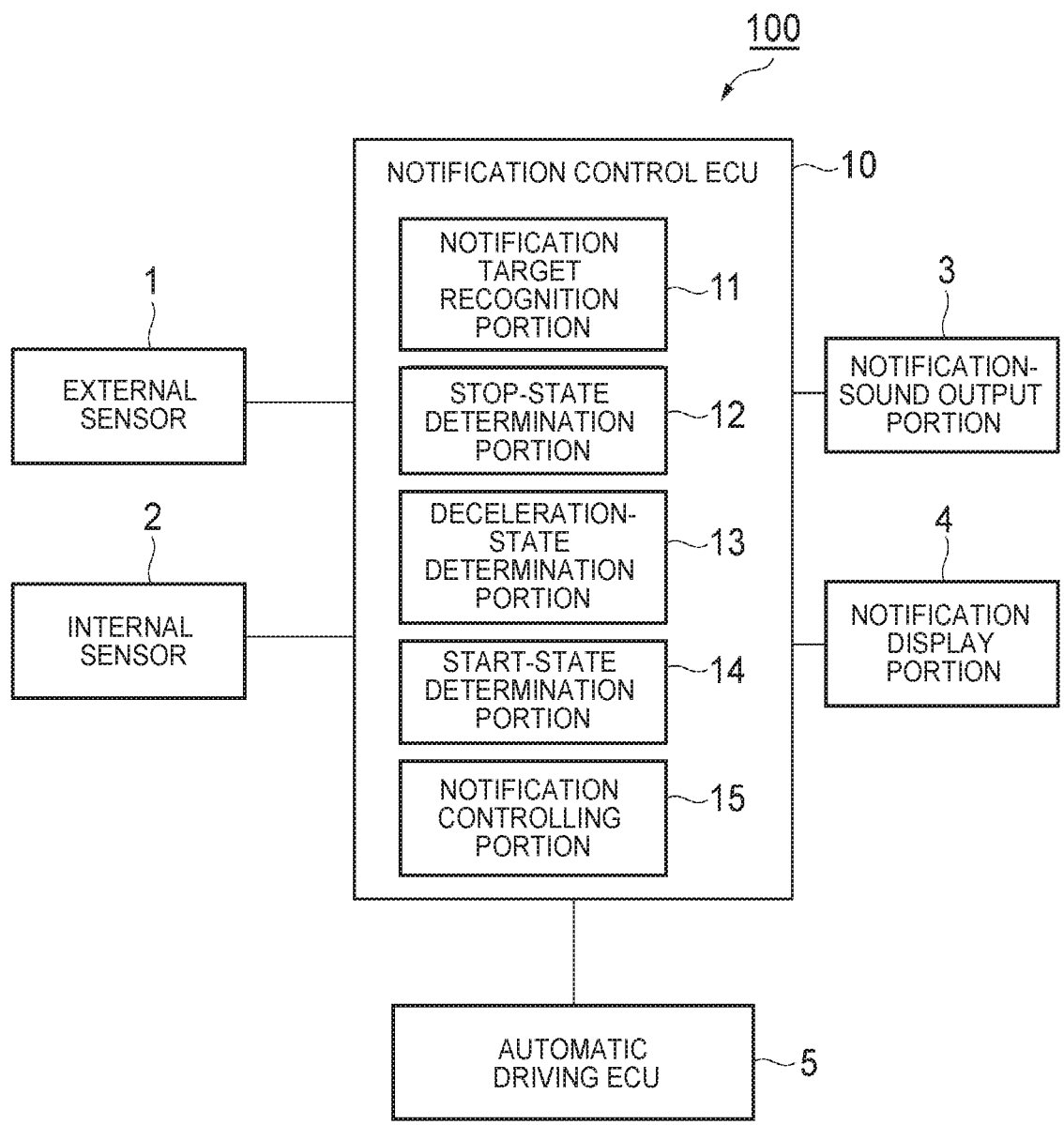
FIG. 1 is a block diagram illustrating a notification device according to one embodiment.

FIG. 1 is a block diagram illustrating a notification device according to one embodiment. A notification device 100 illustrated in FIG. 1 is provided in a vehicle M such as a passenger car and is configured to notify a pedestrian or the like of a state of the vehicle M. The vehicle M is a vehicle traveling by automatic driving. The automatic driving is a vehicle control in which the vehicle M automatically travels toward a destination set in advance. An occupant such as a driver may set the destination, or the vehicle M may automatically set the destination. In the automatic driving, it is not necessary for the driver to perform a driving operation, and the vehicle M automatically travels. The notification device 100 notifies the state of the vehicle M during the automatic driving.

Configuration of Notification Device

As illustrated in FIG. 1, the notification device 100 includes a notification control ECU 10. The notification control ECU 10 is an electronic control unit including a central processing unit (CPU), a read only memory (ROM), a random access memory (RAM), a controller area network (CAN) communication circuit, and so on. The notification control ECU 10 loads a program stored in the ROM to the RAM and implements various functions by executing the program loaded in the RAM by the CPU. The notification control ECU 10 may be constituted by a plurality of electronic control units.

The notification control ECU 10 is connected to an external sensor 1, an internal sensor 2, a notification-sound output portion 3, a notification display portion 4, and an automatic driving ECU 5.

The external sensor 1 is a detection instrument configured to detect a state around the vehicle M. The external sensor 1 detects a position of an object in front of the vehicle M on a road where the vehicle M travels. The external sensor 1 includes at least either one of a camera and a radar sensor.

The camera is an imaging device configured to capture an image of a state outside the vehicle M. The camera is provided on a back side of a windshield of the vehicle M as one example. The camera is configured to acquire imaging information about the state outside the vehicle M. The camera may be a monocular camera or may be a stereoscopic camera. The stereoscopic camera has two imaging portions placed to reproduce binocular parallax. Imaging information of the stereoscopic camera also includes information in a depth direction.

The radar sensor is a detection instrument configured to detect an object around the vehicle M by use of a radio wave (e.g., millimeter wave) or light. For example, the radar sensor includes a millimeter wave radar or a laser imaging detection and ranging (LIDAR) system. The radar sensor transmits a radio wave or light to a region around the vehicle M and detects an object by receiving a radio wave or light reflected from the object.

The internal sensor 2 is a detection instrument configured to detect a traveling state of the vehicle M. The internal sensor 2 includes a vehicle speed sensor, an acceleration sensor, and a yaw rate sensor. The vehicle speed sensor is a detector configured to detect the speed of the vehicle M. As the vehicle speed sensor, a wheel speed sensor provided for a wheel of the vehicle M, a drive shaft rotating integrally with the wheel, or the like so as to detect the rotation speed of the wheel is used, for example.

The acceleration sensor is a detector configured to detect the acceleration of the vehicle M. The acceleration sensor may include a longitudinal acceleration sensor configured to detect the acceleration of the vehicle M in the front-rear direction and a lateral acceleration sensor configured to detect the acceleration of the vehicle M in the lateral direction. The yaw rate sensor is a detector configured to detect the yaw rate (rotation angular velocity) around a vertical axis of the gravitational center of the vehicle M. As the yaw rate sensor, a gyro sensor can be used, for example.

The notification-sound output portion 3 is a sound output device configured to output a notification sound to the outside of the vehicle M. The notification-sound output portion 3 can be speakers provided on the front face of the vehicle M and the opposite side faces of the vehicle M, for example. The notification-sound output portion 3 may be provided only on the front face of the vehicle M or only on the opposite side faces of the vehicle M. The notification-sound output portion 3 may be provided on the back face of the vehicle M or on the top of the vehicle M. The notification-sound output portion 3 is not limited particularly, provided that the notification-sound output portion 3 can output a sound to the outside of the vehicle M.

The notification display portion 4 is an indicator on which a notification display is displayed to the outside of the vehicle M. The notification display portion 4 can be display devices provided on the front face of the vehicle M and the opposite side faces of the vehicle M, for example. The display device displays various images in accordance with a control signal from the notification control ECU 10. The notification display portion 4 may be provided on the back face of the vehicle M. The notification display portion 4 may be provided only on the front face of the vehicle M or only on the opposite side faces of the vehicle M.

Figure 2A:
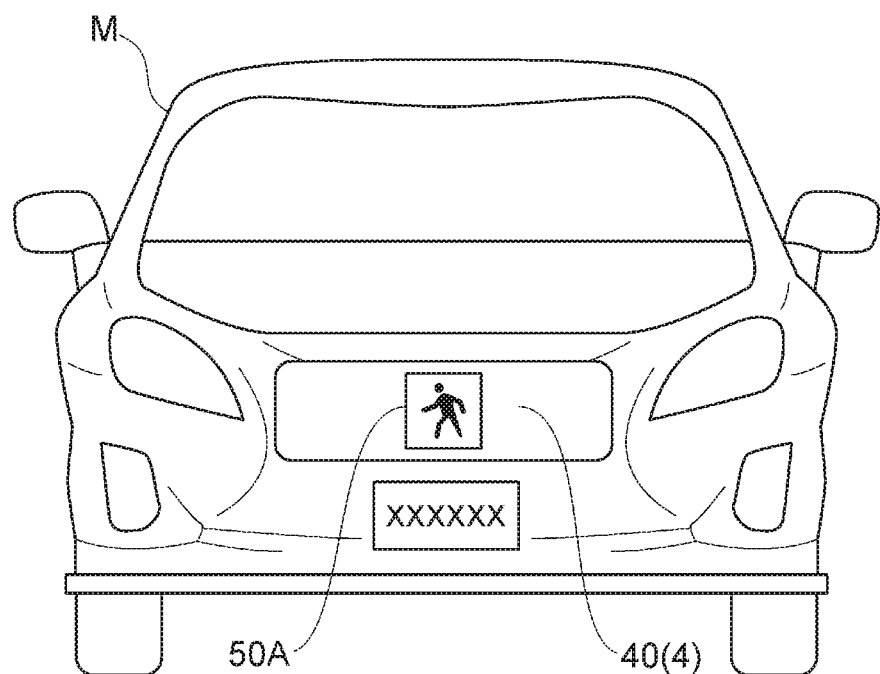
FIG. 2A is a view illustrating one example of a front-face mounting position of a notification display portion.

Here, FIG. 2A is a view illustrating one example of a front-face mounting position of the notification display portion 4. FIG. 2A illustrates a front-face display device 40 constituting the notification display portion 4 and an icon 50A that is one example of the notification display. As illustrated in FIG. 2A, the notification display portion 4 includes one front-face display device 40 provided in a grill room portion of the vehicle M as one example. Note that the notification display portion 4 may be divided into a plurality of display devices. The icon 50A will be described later.

Figure 3A:
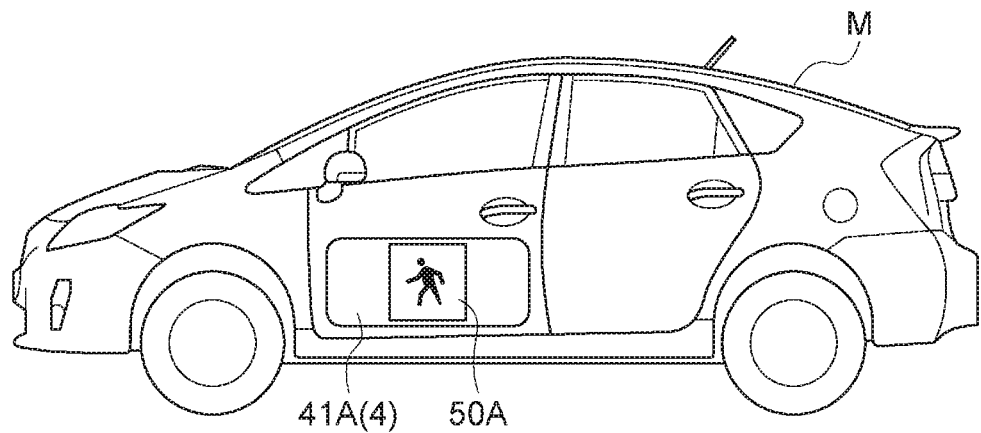
FIG. 3A is a view illustrating one example of a side-face mounting position of the notification display portion.

FIG. 3A is a view illustrating one example of a side-face mounting position of the notification display portion 4. FIG. 3A illustrates a left side-face display device 41A. As illustrated in FIG. 3A, the notification display portion 4 may include the left side-face display device 41A provided on the lower side of a front door of the vehicle M as one example. A right side-face display device can be also provided on the right side of the vehicle M in a similar manner.

Figure 3B:
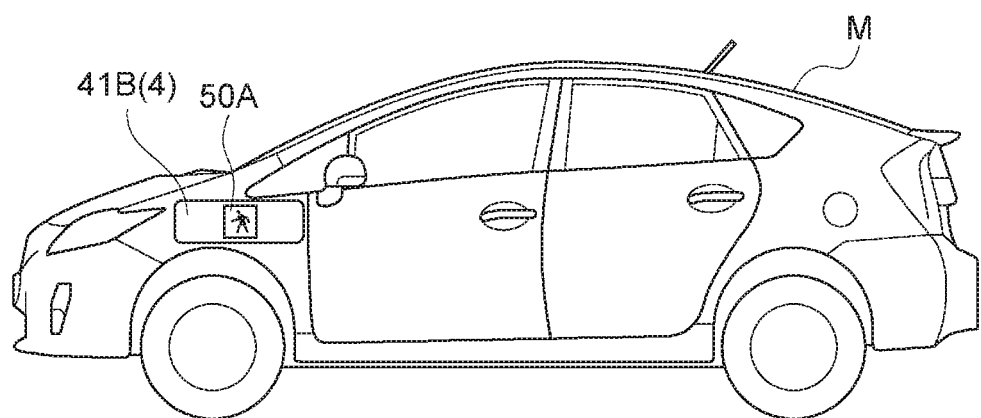
FIG. 3B is a view illustrating another example of the side-face mounting position of the notification display portion.

FIG. 3B is a view illustrating another example of the side-face mounting position of the notification display portion 4. FIG. 3B illustrates a left side-face display device 41B. As illustrated in FIG. 3B, the notification display portion 4 may include the left side-face display device 41B provided in a fender of the vehicle M as another example. A right side-face display device can be also provided on the right side of the vehicle M in a similar manner.

Figure 3C:
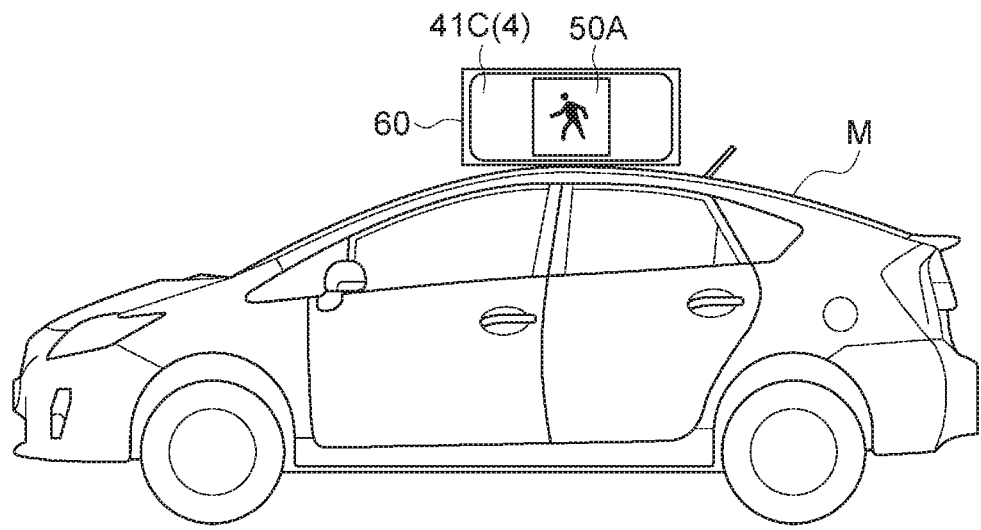
FIG. 3C is a view illustrating further another example of the side-face mounting position of the notification display portion.

FIG. 3C is a view illustrating further another example of the side-face mounting position of the notification display portion 4. FIG. 3C illustrates a left side-face display device 41C and a display support portion 60. The display support portion 60 is a member provided on the top of the vehicle M in order that the left side-face display device 41C or the like is to be provided in the display support portion 60. The display support portion 60 can be a rectangular frame body having surfaces facing the front side, the right and left sides, and the rear side of the vehicle M, for example. A front-face display device may be provided in the display support portion 60 or a back-face display device may be provided in the display support portion 60. The display support portion 60 may be configured as a circular frame body.

As illustrated in FIG. 3C, the notification display portion 4 may include the left side-face display device 41C provided in the display support portion 60 provided on the top of the vehicle M, as further another example. A right side-face display device can be also provided on the right side of the vehicle M in a similar manner. In addition, the notification display portion 4 is not limited particularly, provided that the notification display portion 4 can display a notification display to the outside of the vehicle M.

The automatic driving ECU 5 is an electronic control unit configured to perform automatic driving of the vehicle. The automatic driving ECU 5 includes a CPU, a ROM, a RAM, and so on. The automatic driving ECU 5 may be an electronic control unit integrated with the notification control ECU 10.

The automatic driving ECU 5 generates a course (a course including a route and a vehicle speed profile) along a target route set in advance, based on a state around the vehicle that is obtained from a position of the vehicle on a map, map information, and a detection result of the external sensor 1, and a vehicle state (the vehicle speed, the yaw rate, and the like) obtained from the detection result of the internal sensor 2, for example. The target route may be set manually by the occupant of the vehicle or may be set automatically by a well-known navigation system or the automatic driving ECU 5. The automatic driving ECU 5 can generate the course by a well-known technique. The automatic driving ECU 5 transmits a control signal to actuators (an engine actuator, a brake actuator, a steering actuator, and the like) of the vehicle and thereby executes the automatic driving of the vehicle along the course. When the course of the automatic driving is generated, the automatic driving ECU 5 may transmit course information to the notification control ECU 10.

Next will be described a functional configuration of the notification control ECU 10. As illustrated in FIG. 1, the notification control ECU 10 includes a notification target recognition portion 11, a stop-state determination portion 12, a deceleration-state determination portion 13, a start-state determination portion 14, and a notification controlling portion 15.

The notification target recognition portion 11 recognizes a notification target around the vehicle M. The notification target is a pedestrian, a bicycle, and the like. The notification target may include a two-wheeler or may include other vehicles. The notification target recognition portion 11 may be configured to recognize a notification target only during the automatic driving of the vehicle M.

The notification target recognition portion 11 recognizes a notification target around the vehicle M, based on a detection result of the external sensor 1 (imaging information of the camera, an object detection result of the radar sensor). The notification target recognition portion 11 recognizes a notification target such as a pedestrian by pattern matching, for example.

The stop-state determination portion 12 determines whether the vehicle M during the automatic driving enters the stop state or not, based on a detection result of the internal sensor 2 (e.g., a detection result of the vehicle speed sensor). Whether the automatic driving is performed or not is recognizable by communication with the automatic driving ECU 5. The stop state indicates a state where the vehicle speed of the vehicle M is around 0 kM/h. When the vehicle speed of the vehicle M becomes less than a stop threshold, the stop-state determination portion 12 determines whether the vehicle during the automatic driving enters the stop state or not. The stop threshold is a threshold set in advance and having a value close to zero.

The deceleration-state determination portion 13 determines whether the vehicle M during the automatic driving enters a deceleration state or not, based on a detection result of the internal sensor 2 (e.g., a detection result of the acceleration sensor). The deceleration state is a state where the vehicle M decelerates. When the acceleration of the vehicle M reaches a negative value, for example, the deceleration-state determination portion 13 determines that the vehicle M during the automatic driving enters the deceleration state.

The start-state determination portion 14 determines whether the vehicle M during the automatic driving enters a start state or not, based on a detection result of the internal sensor 2 (e.g., a detection result of the vehicle speed sensor). The start state is a state where the vehicle M starts from the stop state. When the vehicle speed of the vehicle M in the stop state reaches a start threshold or more, for example, the start-state determination portion 14 determines that the vehicle M enters the start state. The start threshold is a threshold set in advance and having a value of zero or more. Note that the determination on the start state may be performed based on the course (the course including a vehicle speed profile) in the automatic driving. When the vehicle M is planned to start by automatic driving within a predetermined period of time, for example, the start-state determination portion 14 may determine that the vehicle M is in the start state regardless of the vehicle speed of the vehicle M.

When a notification target is recognized around the vehicle M by the notification target recognition portion 11, the notification controlling portion 15 notifies the state of the vehicle M during the automatic driving. The notification controlling portion 15 performs notification by a notification sound and a notification display by transmitting a control signal to the notification-sound output portion 3 and the notification display portion 4.

When the state of the vehicle M during the automatic driving is a traveling state, the notification controlling portion 15 outputs a traveling-time notification sound as the notification sound by the notification-sound output portion 3. The traveling state is a state except the stop state, the deceleration state, and the start state in states of the vehicle M.

The traveling-time notification sound can be a sound close to an engine sound. Note that, when the state of the vehicle M during the automatic driving is a normal state, the notification controlling portion 15 may cause the notification display portion 4 to display information indicating that the vehicle M is driven automatically.

The notification controlling portion 15 controls the notification sound of the notification-sound output portion 3 and the notification display of the notification display portion 4. When a notification target is recognized around the vehicle M by the notification target recognition portion 11 and when the stop-state determination portion 12 determines that the vehicle M during the automatic driving enters the stop state, the notification controlling portion 15 outputs a stop-time notification sound as the notification sound by the notification-sound output portion 3 and displays a stop-time notification display as the notification display by the notification display portion 4.

The stop-time notification sound is a notification sound output when the vehicle M is in the stop state. The stop-time notification sound can be a periodic sound the volume or frequency of which changes as time elapses. For example, the stop-time notification sound is an intermittent sound. The intermittent sound is a sound that is output and stopped alternately in a repeated manner as time elapses. The stop-time notification sound can be a sound that expresses a state where the vehicle M stops and is settled down. The stop-time notification sound may be a moderate sound at 1 Hz or less.

Figure 4A:
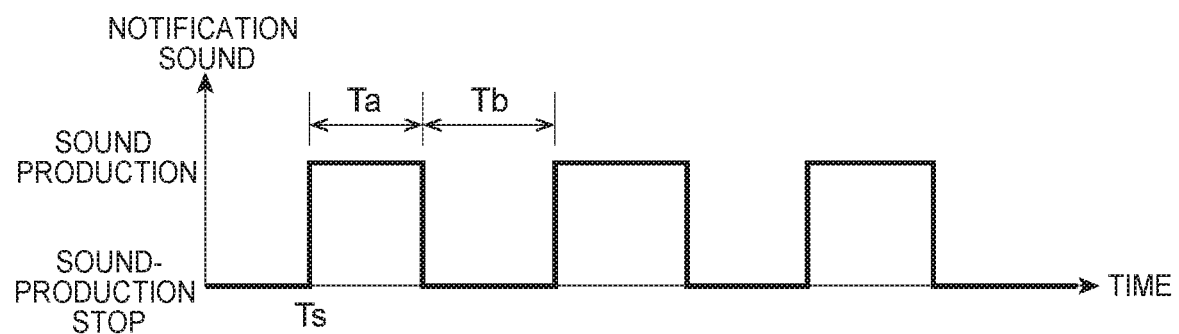
FIG. 4A is a graph to describe a sound-production timing of a stop-time notification sound that is an intermittent sound.

FIG. 4A is a graph to describe a sound-production timing of the stop-time notification sound that is an intermittent sound. The vertical axis of FIG. 4A indicates whether the stop-time notification sound is produced or not, and the horizontal axis indicates time. A sound-production timing Ts, a sound output time Ta, and a sound stop time Tb of the stop-time notification sound are illustrated in FIG. 4A. As illustrated in FIG. 4A, in the stop-time notification sound as an intermittent sound, the sound output time Ta and the sound stop time Tb are repeated as time elapses.

The stop-time notification display is a display when the vehicle M is in the stop state. When a pedestrian who is going to cross a road in front of the vehicle M is recognized, the notification controlling portion 15 may perform a display to promote the pedestrian to cross the road as the stop-time notification display. The icon 50A illustrated in FIG. 2A and FIGS. 3A to 3C is one example of the display to promote the pedestrian to cross the road. The icon 50A may move in an image lateral direction as time elapses or may blink moderately at 1 Hz or less. A display image of the icon is not limited in particular.

Figure 2B:
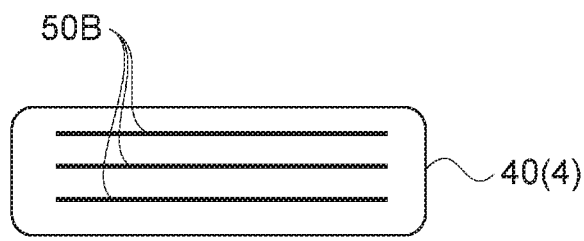
FIG. 2B is a view illustrating another example of an image display.
Figure 2C:
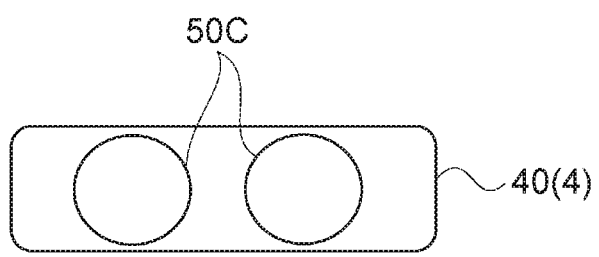
FIG. 2C is a view illustrating further another example of the image display.

FIG. 2B is a view illustrating another example of the stop-time notification display. As illustrated in FIG. 2B, the stop-time notification display may be a display in which images 50B of three horizontal lines or three crossbars are arranged in the vertical direction. The number of lines is not limited in particular. Further, FIG. 2C is a view illustrating further another example of the stop-time notification display. As illustrated in FIG. 2C, the stop-time notification display may be a display in which two circular images 50C are arranged in the horizontal direction. The number of circles is not limited. These image displays are not limited to the stop-time notification display and may be used at the time of deceleration or start of the vehicle M. A case where the vehicle M stops and a case where the vehicle M decelerates or starts moving can be distinguished based on whether flashing is performed or not, a flashing speed, whether the color changes or not, or the like.

The stop-time notification display can be a periodic display the luminance or chromaticity of which changes as time elapses. For example, the stop-time notification display is a flashing display. The flashing display is a display in which a lighting state and a light-out state are repeated. The stop-time notification display may flash moderately at less than 1 Hz.

Figure 4B:
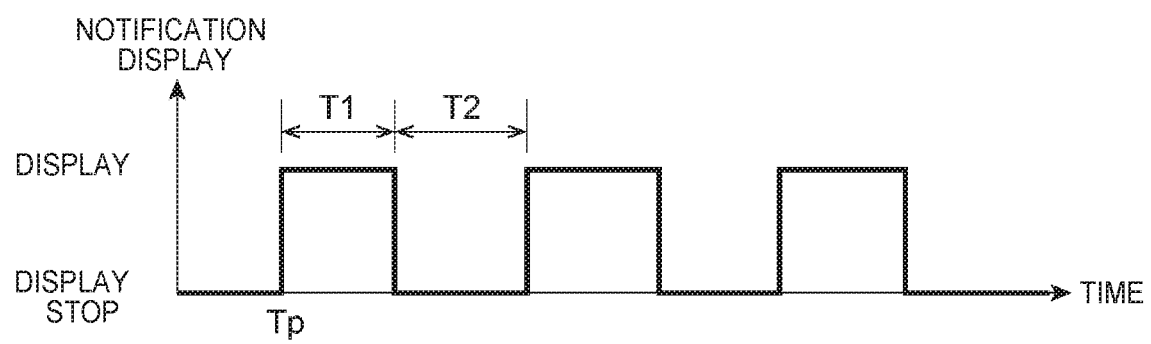
FIG. 4B is a graph to describe a lighting timing of a stop-time notification display that is a flashing display.

FIG. 4B is a graph to describe a lighting timing of the stop-time notification display that is a flashing display. The vertical axis of FIG. 4B indicates whether the stop-time notification display is lit or not, and the horizontal axis indicates time. A lighting timing Tp, a lighting time T1, and a light-out time T2 of the stop-time notification display are illustrated in FIG. 4B. As illustrated in FIG. 4B, in the stop-time notification display as a flashing display, the lighting time T1 and the light-out time T2 are repeated as time elapses.

The notification controlling portion 15 causes the change of the stop-time notification sound over time to correspond to the change of the stop-time notification display over time. More specifically, as illustrated in FIGS. 4A and 4B, the notification controlling portion 15 causes the sound-production timing of the stop-time notification sound as an intermittent sound to correspond to the lighting timing of the stop-time notification display as a flashing display. That is, in FIGS. 4A and 4B, the sound-production timing Ts of the stop-time notification sound and the lighting timing Tp of the stop-time notification display are the same timing. Further, the sound output time Ta can be the same time as the lighting time T1, and the sound stop time Tb can be the same time as the light-out time T2.

When a notification target is recognized around the vehicle M by the notification target recognition portion 11 and the deceleration-state determination portion 13 determines that the vehicle M during the automatic driving enters the deceleration state, the notification controlling portion 15 outputs a deceleration-time notification sound as the notification sound by the notification-sound output portion 3 and displays a deceleration-time notification display as the notification display by the notification display portion 4.

The deceleration-time notification sound is a notification sound output when the vehicle M is in the deceleration state. The deceleration-time notification sound can be a periodic sound the volume or frequency of which changes as time elapses. For example, the deceleration-time notification sound is a discontinuous sound. The deceleration-time notification sound is a sound simulating moving noise or engine sound of the vehicle M and can be a sound that gives an impression that the vehicle M approaches a listener. The deceleration-time notification sound may be a sound without an oppressive feeling at around 1 Hz (for example, not less than 0.8 Hz but less than 1.2 Hz).

The deceleration-time notification display is a display output when the vehicle M is in the deceleration state. The deceleration-time notification display can be a periodic display the luminance or chromaticity of which changes as time elapses. For example, the deceleration-time notification display is a flashing display. The deceleration-time notification display may flash moderately at 1 Hz or less, provided that the deceleration-time notification display can be distinguished from the stop-time notification display. The deceleration-time notification display may be a blinking display directed from the upper side to the lower side of the front-face display device 40 or from the outer side to the inner side of the front-face display device 40. The deceleration-time notification display may be a display on which an icon indicative of deceleration of the vehicle M moves.

When the deceleration-time notification sound is a periodic sound and the deceleration-time notification display is a periodic display, the notification controlling portion 15 causes the change of the deceleration-time notification sound over time to correspond to the change of the deceleration-time notification display over time (see FIGS. 4A and 4B).

When a notification target is recognized around the vehicle M by the notification target recognition portion 11 and the start-state determination portion 14 determines that the vehicle M during the automatic driving enters the start state, the notification controlling portion 15 outputs a start-time notification sound as the notification sound by the notification-sound output portion 3 and displays a start-time notification display as the notification display by the notification display portion 4.

The start-time notification sound is a notification sound output when the vehicle M is in the start state. The start-time notification sound can be a periodic sound the volume or frequency of which changes as time elapses. For example, the start-time notification sound is a discontinuous sound. The start-time notification sound can be a sound that gives an impression that notifies the surroundings that the vehicle M is about to start moving. The start-time notification sound may be a sound having a slightly oppressive feeling, generally at 1.5 Hz or more.

The start-time notification display is a display output when the vehicle M is in the start state. The start-time notification display can be a periodic display the luminance or chromaticity of which changes as time elapses. For example, the start-time notification display is a flashing display. The start-time notification display may quickly flash at 1 Hz or more. The start-time notification display may be a blinking display directed from the lower side to the upper side of the front-face display device 40 or from the inner side to the outer side of the front-face display device 40. The start-time notification display may be a display on which an icon indicative of start of the vehicle M moves.

When the start-time notification sound is a periodic sound and the start-time notification display is a periodic display, the notification controlling portion 15 causes the change of the start-time notification sound over time to correspond to the change of the start-time notification display over time (see FIGS. 4A and 4B).

Operation of Notification Device

Next will be described the operation of the notification device 100 according to the present embodiment with reference to the drawings. FIG. 5A is a flowchart illustrating one example of a notification process. A notification sound output process is performed when the vehicle M is driven automatically, for example.

As illustrated in FIG. 5A, the notification control ECU 10 of the notification device 100 performs detection by the external sensor 1 in S10. The notification control ECU 10 recognizes a detection result such as an object around the vehicle M that is detected by the external sensor 1.

In S12, the notification control ECU 10 determines whether a notification target is recognized by the notification target recognition portion 11 or not. The notification target recognition portion 11 recognizes the notification target around the vehicle M, based on the detection result of the external sensor 1. When the notification target is recognized (S12: YES), the notification control ECU 10 shifts to S14. When the notification target is not recognized (S12: NO), the notification control ECU 10 ends this process. After that, the notification control ECU 10 repeats the process from S10 again after a given period of time has elapsed.

In S14, the notification control ECU 10 performs a notification process by the notification controlling portion 15. The notification controlling portion 15 performs notification corresponding to the state of the vehicle M. When the notification target is not recognized, the notification process is terminated.

FIG. 5B is a flowchart illustrating one example of a stop-time notification process. The stop-time notification process is performed in the notification process illustrated in FIG. 5A.

As illustrated in FIG. 5B, the notification control ECU 10 detects the vehicle speed by the internal sensor 2 in S20. After that, in S22, the notification control ECU 10 determines, by the stop-state determination portion 12, whether the vehicle M during the automatic driving enters the stop state or not. When it is determined that the vehicle M enters the stop state (S22: YES), the notification control ECU 10 shifts to S24. When it is not determined that the vehicle M enters the stop state (S22: NO), the notification control ECU 10 ends this process. After that, in a case where the notification process is not terminated, the notification control ECU 10 repeats the process from S20 again after a given period of time has elapsed.

In S24, the notification control ECU 10 causes the notification controlling portion 15 to output the stop-time notification sound and the stop-time notification display such that they correspond to each other. The notification controlling portion 15 causes the sound-production timing of the stop-time notification sound as an intermittent sound to correspond to the lighting timing of the stop-time notification display as a flashing display.

Figure 6A:
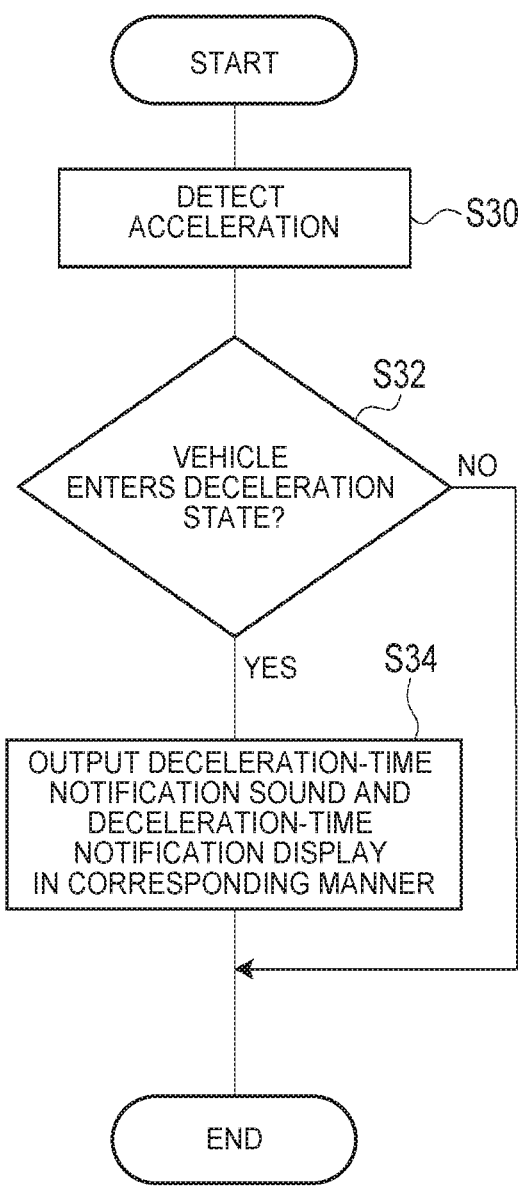
FIG. 6A is a flowchart illustrating one example of a deceleration-time notification process.

FIG. 6A is a flowchart illustrating one example of a deceleration-time notification process. The deceleration-time notification process is performed in the notification process illustrated in FIG. 5A.

As illustrated in FIG. 6A, the notification control ECU 10 detects the acceleration by the internal sensor 2 in S30. After that, in S32, the notification control ECU 10 determines, by the deceleration-state determination portion 13, whether the vehicle M during the automatic driving enters the deceleration state or not. When it is determined that the vehicle M enters the deceleration state (S32: YES), the notification control ECU 10 shifts to S34. When it is not determined that the vehicle M enters the deceleration state (S32: NO), the notification control ECU 10 ends this process. After that, in a case where the notification process is not terminated, the notification control ECU 10 repeats the process from S30 again after a given period of time has elapsed.

In S34, the notification control ECU 10 causes the notification controlling portion 15 to output the deceleration-time notification sound and the deceleration-time notification display such that they correspond to each other. The notification controlling portion 15 causes the sound-production timing of the deceleration-time notification sound as a periodic discontinuous sound to correspond to the lighting timing of the periodic deceleration-time notification display.

Figure 6B:
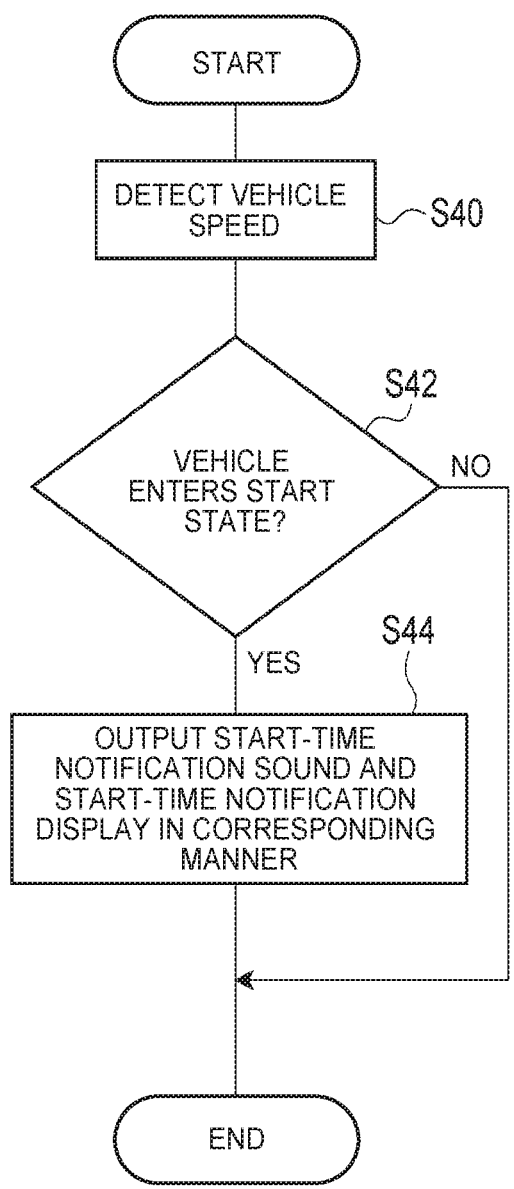
FIG. 6B is a flowchart illustrating one example of a start-time notification process.

FIG. 6B is a flowchart illustrating one example of a start-time notification process. The start-time notification process is performed as a part of the notification process illustrated in FIG. 5A, when it is determined that the vehicle M is in the start state.

As illustrated in FIG. 6B, the notification control ECU 10 detects the vehicle speed by the internal sensor 2 in S40. After that, in S42, the notification control ECU 10 determines, by the start-state determination portion 14, whether the vehicle M during the automatic driving enters the start state or not. When it is determined that the vehicle M enters the start state (S42: YES), the notification control ECU 10 shifts to S44. When it is not determined that the vehicle M enters the start state (S42: NO), the notification control ECU 10 ends this process. After that, in a case where the notification process is not terminated, the notification control ECU 10 repeats the process from S40 again after a given period of time has elapsed.

In S44, the notification control ECU 10 causes the notification controlling portion 15 to output the start-time notification sound and the start-time notification display such that they correspond to each other. The notification controlling portion 15 causes the sound-production timing of the periodic start-time notification sound to correspond to the lighting timing of the start-time notification display as a flashing display. The start-time notification sound and the start-time notification display are terminated after a given period of time has elapsed.

Note that, in a case where the vehicle M is not in any of the stop state, the deceleration state, and the start state, the notification control ECU 10 may determine that the vehicle M is in a normal driving state and may output a normal-time notification sound.

In the notification device 100 according to the present embodiment as described above, when it is determined that the vehicle M during the automatic driving enters the stop state, the notification sound by the notification-sound output portion 3 is changed from the traveling-time notification sound to the stop-time notification sound, and the stop-time notification display is output as the notification display by the notification display portion 4. This makes it possible to appropriately notify the stop state of the vehicle M to a pedestrian or the like around the vehicle M by the display in addition to the sound.

Further, in the notification device 100, the stop-time notification sound is an intermittent sound. Accordingly, an impression that the vehicle M stops can be given to a pedestrian or the like around the vehicle M, thereby making it possible for the pedestrian or the like to easily recognize the stop state of the vehicle M.

Further, in the notification device 100, the change of the stop-time notification sound the volume or frequency of which changes as time elapses is caused to correspond to the change of the stop-time notification display the luminance or chromaticity of which changes as time elapses. This accordingly makes it possible for the pedestrian or the like around the vehicle M to more easily recognize the stop state of the vehicle M. Further, in a case where a plurality of vehicles is present, the pedestrian or the like can recognize which vehicle outputs the stop-time notification sound, from the correspondence with the stop-time notification display.

Further, in the notification device 100, when it is determined that the vehicle M during the automatic driving is in the deceleration state, the deceleration-time notification sound is output as the notification sound by the notification-sound output portion 3, and the deceleration-time notification display is output as the notification display by the notification display portion 4. This makes it possible to appropriately notify the deceleration state of the vehicle M to the pedestrian or the like around the vehicle M. Similarly, in the notification device 100, when it is determined that the vehicle M during the automatic driving is in the start state, the start-time notification sound is output as the notification sound by the notification-sound output portion 3, and the start-time notification display is output as the notification display by the notification display portion 4. This makes it possible to appropriately notify the start state of the vehicle M to the pedestrian or the like around the vehicle M.

The embodiment of the disclosure has been described above, but the disclosure is not limited to the above embodiment. The disclosure can be performed in various forms including various alterations and modifications made based on the knowledge of a person skilled in the art, in addition to the above embodiment.

The notification display portion 4 is not limited to a display device. The notification display portion 4 may be a lighting device (lamp). The type of the lighting device is not limited particularly but can be a light emitting diode (LED). The notification display portion 4 may be a lighting device for notification as one example.

Figure 7A:
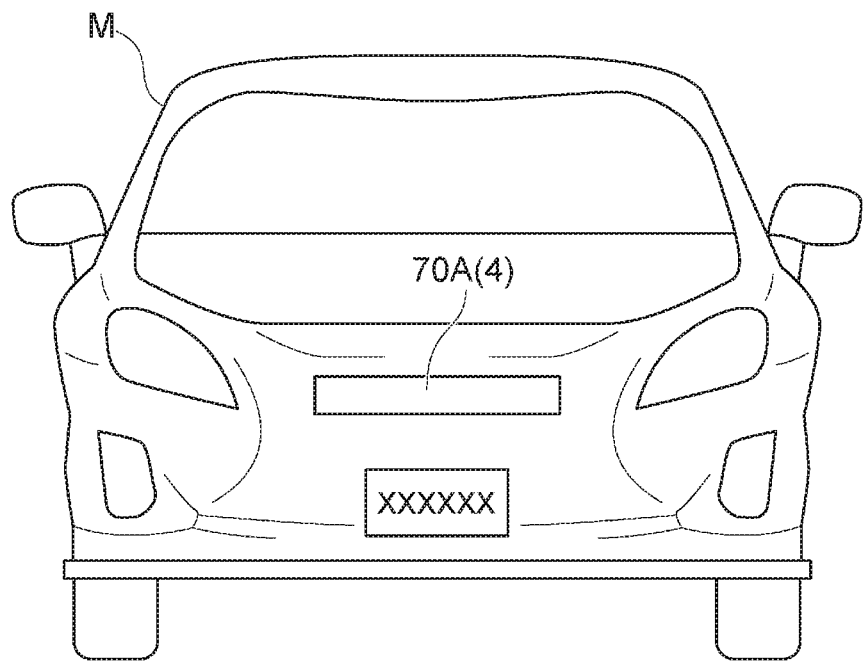
FIG. 7A is a view illustrating one example of a front-face mounting position in a case where the notification display portion is a lighting device.

FIG. 7A is a view illustrating one example of the front-face mounting position in a case where the notification display portion 4 is a lighting device. A front-face lighting device 70A for notification is illustrated in FIG. 7A. As illustrated in FIG. 7A, the notification display portion 4 can include one front-face lighting device 70A provided in a grill room portion on the front face of the vehicle M.

Figure 7B:
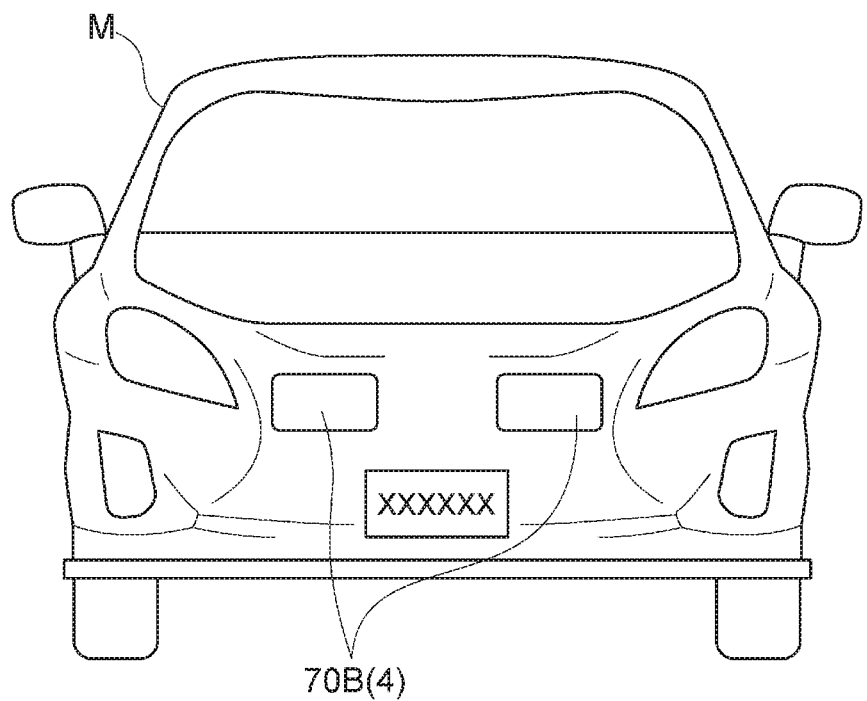
FIG. 7B is a view illustrating one example of the front-face mounting position in a case where the notification display portion is a lighting device.

FIG. 7B is a view illustrating another example of the front-face mounting position in a case where the notification display portion 4 is a lighting device. A front-face lighting device 70B for notification is illustrated in FIG. 7B. As illustrated in FIG. 7B, the notification display portion 4 may include two separate front-face lighting devices 70B provided on the right and left sides of the grill room portion on the front face of the vehicle M.

Figure 8:
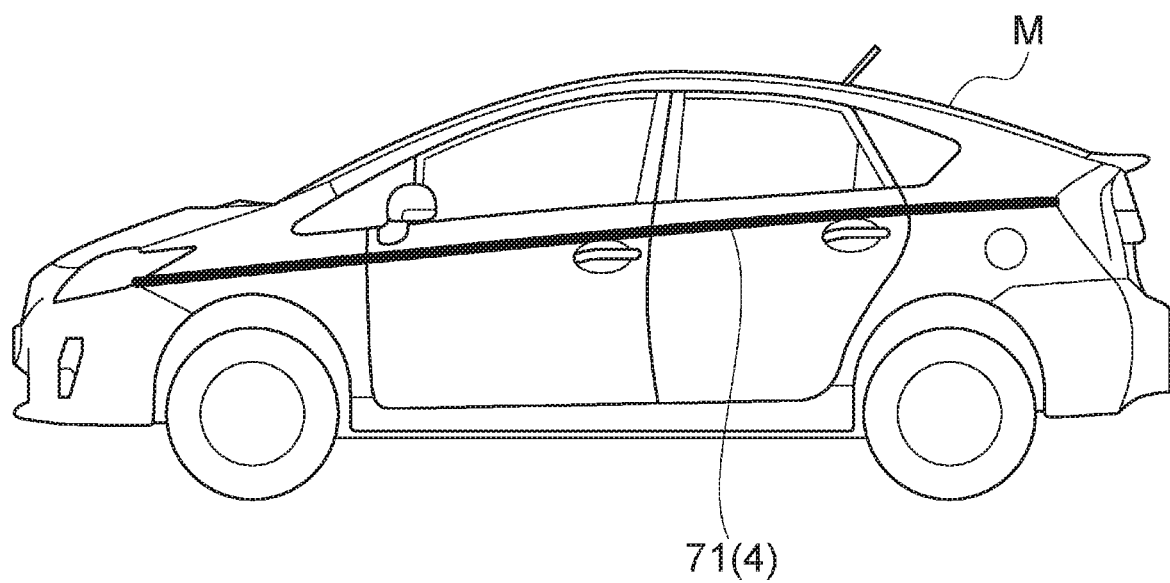
FIG. 8 is a view illustrating one example of a left side-face mounting position in a case where the notification display portion is a lighting device.

FIG. 8 is a view illustrating one example of a left side-face mounting position in a case where the notification display portion 4 is a lighting device. A side-face lighting device 71 for notification is illustrated in FIG. 8. As illustrated in FIG. 8, the notification display portion 4 may include one side-face lighting device 71 extending in the front-rear direction of the vehicle M along the side face of the vehicle M. The right side face of the vehicle M can be configured in a similar manner. Note that the notification display portion 4 may be provided on the front face of the vehicle M, may be provided on the opposite side faces of the vehicle M, or may be provided on the rear face of the vehicle M.

The notification device 100 may not necessarily include the notification target recognition portion 11. The notification device 100 may be configured to notify the state of the vehicle M during the automatic driving, regardless of whether the notification target around the vehicle M is recognized or not. The notification device 100 may notify the state of the vehicle M in accordance with the position of the vehicle M on the map. The notification device 100 may not perform notification in a driveway and may perform notification in an open road, for example.

Note that the notification controlling portion 15 may not necessarily perform the deceleration-time notification display and may output only the deceleration-time notification sound. Similarly, the notification controlling portion 15 may not necessarily perform the start-time notification display and may output only the start-time notification sound.

Further, the notification device 100 may not necessarily determine the deceleration state. In this case, the notification device 100 may not include the deceleration-state determination portion 13. Similarly, the notification device 100 may not necessarily determine the start state. In this case, the notification device 100 may not include the start-state determination portion 14.

The stop-time notification sound is not limited to an intermittent sound. The stop-time notification sound may be a periodic sound in which a large sound and a small sound are repeated in a continuous sound in which the output of the sound continues. The stop-time notification sound may be a periodic sound in which a high-pitched sound and a low-pitched sound are repeated, and the volume of the sound may be reduced to a given value while the high-pitched sound and the low-pitched sound are repeated. Further, the stop-time notification sound may not necessarily change in volume or frequency as time elapses. The stop-time notification sound may be a continuous sound that does not change as time elapses. This point also applies to the deceleration-time notification sound and the start-time notification sound. A notification sound in the normal driving, the stop-time notification sound, the deceleration-time notification sound, and the start-time notification sound should be distinguished from each other.

The stop-time notification display is not limited to a flashing display. The stop-time notification display may not necessarily disappear and may be a periodic display in which a display with a high luminance and a display with a low luminance are repeated. The stop-time notification display may be a periodic display in which alternate changes in chromaticity (for example, green and yellow) are repeated. Further, the stop-time notification display may not necessarily change in luminance or chromaticity as time elapses. The stop-time notification display may be a lighting state that does not change as time elapses. This point also applies to the deceleration-time notification display and the start-time notification display. The stop-time notification display, the deceleration-time notification display, and the start-time notification display should be distinguished from each other.

What is claimed is:

1. A method comprising:
   determining whether a vehicle enters a stop state during automatic driving; and
   in response to determining that the vehicle enters the stop state during automatic driving, outputting a stop-state notification sound and a stop-state notification display toward an outside of the vehicle, the stop-state notification sound being an intermittent sound.

2. The method according to claim 1, further comprising:
   changing the stop-state notification sound in volume or frequency as time elapses; and
   changing the stop-state notification display in luminance or chromaticity as time elapses,
   wherein the change of the stop-state notification sound corresponds to the change of the stop-state notification display.

3. The method according to claim 2, wherein:
   the stop-state notification display is a flashing display; and
   a sound-production timing of the stop-state notification sound as the intermittent sound corresponds to a lighting timing of the stop-state notification display as the flashing display.

4. The method according to claim 1, further comprising:
   determining whether the vehicle is in a deceleration state during the automatic driving; and
   in response to determining that the vehicle is in the deceleration state during the automatic driving, outputting a deceleration-time notification sound toward the outside of the vehicle.

5. The method according to claim 1, wherein the stop state is detected in response to a speed of the vehicle being below a predetermined stop threshold.

* * * * *